(12) United States Patent
Bahl et al.

(10) Patent No.: US 8,214,889 B2
(45) Date of Patent: Jul. 3, 2012

(54) SELECTIVE AUTO-REVOCATION OF FIREWALL SECURITY SETTINGS

(75) Inventors: Pradeep Bahl, Redmond, WA (US); Gerardo Diaz Cuellar, Snoqualmie, WA (US); Rajesh Dadhia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 11/592,778

(22) Filed: Nov. 3, 2006

(65) Prior Publication Data

US 2008/0109890 A1  May 8, 2008

(51) Int. Cl.
G06F 21/00 (2006.01)
(52) U.S. Cl. .......................................................... 726/11
(58) Field of Classification Search ...................... 726/11
See application file for complete search history.

(56) References Cited

U.S. PATENT DOCUMENTS

| | | | |
|---|---|---|---|
| 5,958,016 A | 9/1999 | Chang et al. | |
| 6,182,226 B1 | 1/2001 | Reid et al. | |
| 6,230,271 B1 | 5/2001 | Wadlow et al. | |
| 6,330,610 B1 | 12/2001 | Docter et al. | |
| 6,453,419 B1 | 9/2002 | Flint et al. | |
| 7,062,752 B2 | 6/2006 | Simpson et al. | |
| 7,089,586 B2 | 8/2006 | Kilgore | |
| 2002/0083059 A1 | 6/2002 | Hoffman et al. | |
| 2002/0166068 A1 | 11/2002 | Kilgore | |
| 2003/0016804 A1* | 1/2003 | Sheha et al. | 379/201.06 |
| 2003/0167405 A1 | 9/2003 | Freund et al. | |
| 2004/0088571 A1 | 5/2004 | Jerrim et al. | |
| 2005/0138416 A1 | 6/2005 | Qian et al. | |
| 2005/0182969 A1* | 8/2005 | Ginter et al. | 713/201 |

OTHER PUBLICATIONS

Hazelhurst, "Semantics, Implementation, and Performance of Dynamic Access Lists for TCP/IP Packet Filtering", 2004, pp. 1-14.*
"LogMeln Rescue", Date: 2006, https://secure.logmeinrescue.com/HelpDesk/Pdfs/datasheet.pdf.
Keromytis et al., "Managing Access Control in Large Scale Heterogeneous Networks", 2003, pp. 1-5.
Ribeiro et al., "A Roaming Authentication Solution for Wifi using IPSec VPNs with client certificates", Date: 2004, http://www.terena.nl/publications//tnc2004-proceedings/papers/ribiero.pdf.
Vannel et al., "SEVA: a framework to dynamically set up and run secure extranet", http://www.eurecom.fr/~nsteam/Papers/gp5D981.pdf.

* cited by examiner

*Primary Examiner* — Nasser Goodarzi
*Assistant Examiner* — Lisa Lewis
(74) *Attorney, Agent, or Firm* — Alleman Hall McCoy Russell & Tuttle LLP

(57) ABSTRACT

Management of security firewall settings in a networked computing environment is described. One example embodiment includes applying security settings and exceptions to the security settings based on network class for network communication, and upon detection of an event, revoking at least one exception for at least one network in a specified class.

16 Claims, 7 Drawing Sheets

SELECTIVE AUTO-REVOCATION OF FIREWALL SECURITY SETTINGS

BACKGROUND

A data communication firewall may generally include a hardware or software filter that prevents data packets from either entering or leaving a network unless specifically authorized. A firewall may be provided as a program executed on a user's computer ("host firewall"), or as a dedicated machine provided at an edge of a network ("edge firewall"). To control the flow of network traffic, numbered ports in the firewall are either opened or closed to packets depending upon security settings applied by the firewall. Such security settings may include various rules, and are used to implement desired firewall operation. The settings applied may vary depending on a class of a network with which a device communicates. Further, requesters, such as users, applications, and services, may utilize firewall administration rights to set exceptions to the firewall rules which may open one or more ports and enable network traffic that would otherwise, be blocked and/or limited.

If exceptions enabled for one network remain enabled for other networks after the occurrence of a certain event, or events, security risk may be increased. In one example, a firewall may manage traffic over a first network using a rule having an exception enabled for the first network. The first network may have a high security setup and/or infrastructure. However, the firewall may also manage traffic over a second network that is less secure in terms of its security setup and/or infrastructure. As such, if the exception enabled for the first network is applied to communication over the second network, there may be an unintended increased security risk with respect to the second network. Alternatively, if the exception is applied only to the first network, a requester may need to repeatedly enable the exception for the second and any additional networks, thus degrading usability and/or efficiency.

SUMMARY

Firewall setting management to address various issues is described. For example, security settings of a firewall may be applied and then selectively revoked, where the revocation is based upon triggering events. Further, the selective revocation may be based on the class of network to which the firewall is connected.

Thus, under conditions of increased security risk, triggering events can cause auto-revocation of security settings, such as firewall exceptions. Alternatively, under conditions of decreased security risk, maintenance of security settings may be used. In this way, the user may experience both increased usability and security.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
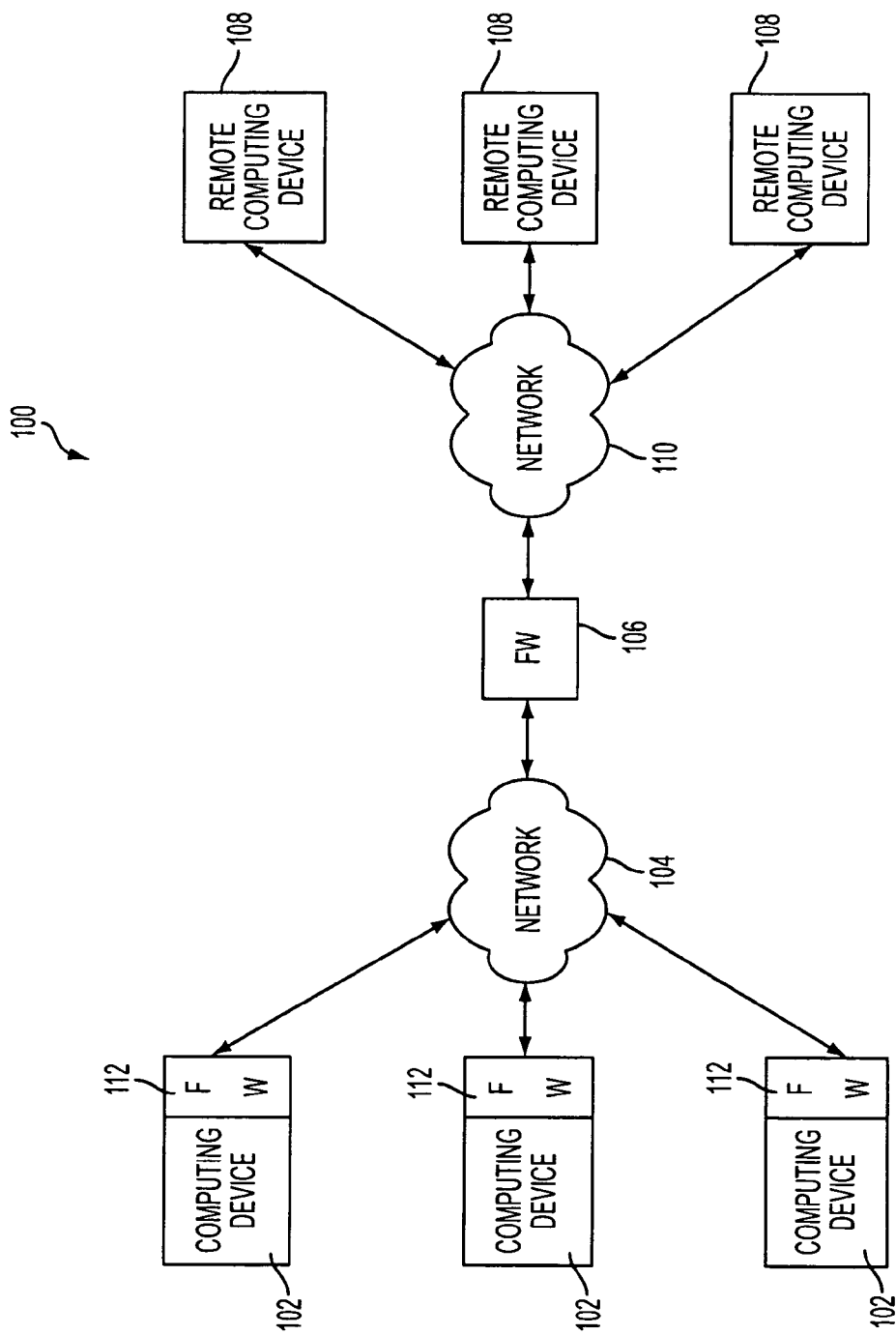
FIG. 1 is a diagram showing one example of a computing network.

The figures describe approaches of a computing system using security features to control network traffic. The security features may include a firewall, which can be implemented in software, hardware, or combinations thereof. The firewall may be a host firewall, an edge firewall, or both. The firewall may include various security settings. The security settings may include rules, exceptions to the rules, a scope of an exception, and/or flags. Exceptions may include program-exceptions, port exceptions and/or other constructs that represent an endpoint uniquely on a system. Program exceptions may enable an added program to receive and/or send certain types of traffic. Likewise, port exceptions may enable an added port to receive and/or send certain types of traffic. A scope of an exception may refer to a particular subset of communication to which the exception is applied, such as communication over networks of a specified class. The flags may specify further features of the rules, exceptions, and scope, such as whether exceptions are maintained under selected condition, or revoked under selected conditions. A group of security settings may be organized into a security profile.

The firewall may control network traffic over a network based on the security settings, as well as based on characteristics of a connected network, such as network classification (which may be referred to as a network class). A network class refers to a label for a network having a plurality of network characteristics that together give a general indication of the network function, security risk level, user base, and others. Security profiles may vary depending on network classes, machine system configuration, network user, etc. For example, as noted above, exceptions may have a scope that is limited to a particular network class.

The firewall may apply and automatically revoke security settings, such as exceptions, in response to triggering events. Triggering events may include various events, such as network connection events, network classification events, network security events, and others. As one example, triggering events may include the occurrence of a new network connection, software downloads over a network, user actions with respect to a network, and various others. As another example, triggering events may include an event that affects (either increases or decreases) a security risk of network communication.

One or more security settings, such as exceptions made in a firewall profile, may be either maintained across all networks of a specified class, or automatically revoked based upon selected triggering events. Maintaining exceptions across networks of a specified class may be used to increase usability, so that a user, for example, is not required to repeatedly re-enable firewall exceptions after every triggering event. Alternatively, automatically revoking exceptions upon triggering events for networks of a specified class may be used to increase security. For example, if two networks of the same class have different exceptions enabled, automatically revoking the enabled exceptions active on the current network upon a network switch triggering event (e.g., disconnecting from the first network and connecting to the second network) may alleviate a user's mental burden of remembering to disable exceptions. Thus, increased security may be obtained.

Referring now to FIG. 1, illustrated therein is a generalized diagram of one possible network environment 100. Network environment 100 includes several computing devices 102 connected to network 104 over which the computing devices 102 may communicate with one another. Network 104 may include various interconnected networking devices, such as routers, gateways, hubs, etc., which transport communications between computing devices 102. Connections over network 104 may be a wireless, wired, direct, virtual private network, or another type of network connection. When communicating with one another over network 104, one or more computing devices 102 may act as clients, servers, peer computing devices, or combinations thereof with respect to other computing devices 102. Accordingly, it will be appreciated that the embodiments described herein may be practiced on clients, servers, peers, combinations thereof, or others.

FIG. 1 also shows a remote network 110 including several computing devices 108 connected to network 110 over which the computing devices 108 may communicate with one another. As noted with regard to network 104, network 110 may include various interconnected networking devices, such as routers, gateways, hubs, etc. Furthermore, connections over network 110 may be a wireless, wired, or another type of network connection.

Computing devices 102 and other components of network 104 are protected by a common firewall 106. Firewall 106 protects computing devices 102 from remote computing devices 108 located on remote network 110, which may be a less secure, public network such as the Internet. Alternatively, remote network 110 may be a network other than the Internet, such as a wide area network or a different area network. Further, each computing device 102 also may include a firewall 112.

While the example computing and networking environment of FIG. 1 shows several examples of a firewall, various other computing and networking environments may also be used with fewer or additional firewalls.

Figure 2:
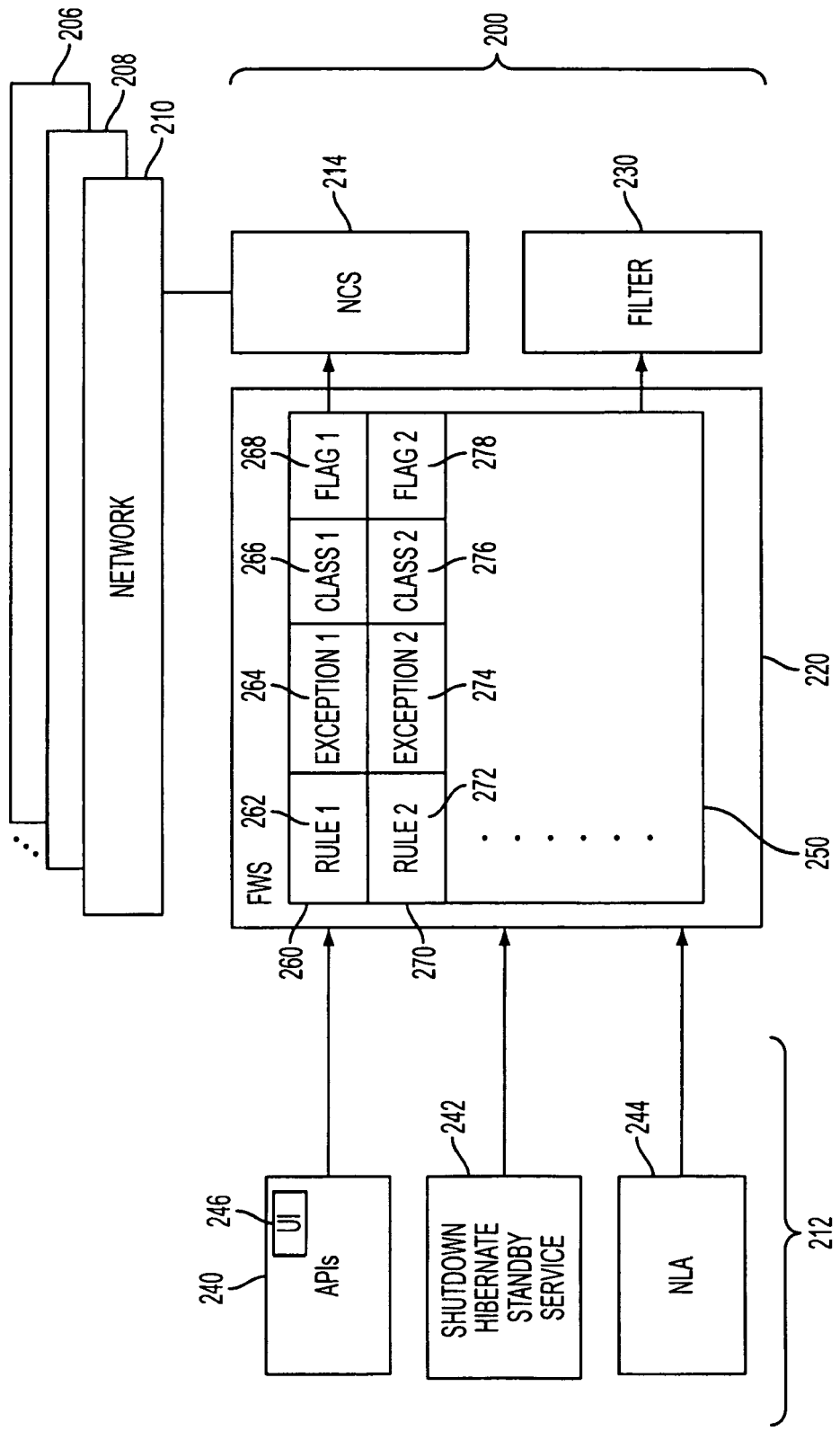
FIG. 2 is a diagram showing one example of a firewall system.

Referring now to FIG. 2, an example firewall system 200 is shown. The example firewall system 200, as well as the corresponding process flow of FIGS. 4-7, may be implemented, for example, via computer-executable instructions or code, such as programs, stored on and executed by a computing device. Generally, programs may include routines, objects, components, data structures, and the like that perform particular tasks or implement particular abstract data types. The term "program" as used herein may connote a single program or multiple programs acting in concert, and may be used to denote both applications, services (i.e. programs running in the background), and an operating system. Likewise, the term "computing device" or machine as used herein includes devices that electronically execute one or more programs, including but not limited to personal computers, servers, laptop computers, hand-held devices, cellular phones and other micro-processor-based programmable consumer electronics and/or appliances, routers, gateways, hubs and other computer networking devices, etc.

The firewall system 200 of FIG. 2 may provide firewall functionality for a client connected to one or more networks, such as described in FIG. 1. In the example of FIG. 2, the firewall system 200 is coupled to, and communicates with, a network 210. While a single network 210 may be present, the firewall system 200 may be connected to a plurality of networks, including networks 206, 208, etc. Further, different networks may be connected at different times.

The firewall system 200 also communicates with a plurality of programs 212. Programs 212 may include various requesters, such as services and/or applications that communicate requests to the firewall system 200. Requests may include requests for communication to and/from a network, such as network 210. Requests may also include requests to apply a security setting and modify a security setting for communication over one or more networks, such as network 210. Further, the programs 212 may communicate data or information used to manage security settings, including the occurrence of triggering events that may be used to revoke security settings.

As shown in FIG. 2, programs 212 may include application program interfaces (APIs) 240, a client shutdown, hibernation, and/or standby service (SHS) 242, and a network location awareness service (NLA) 244. APIs 240 may initiate various requests that may include requests from various applications or various application set-up routines. Further, requests from the APIs 240 may include requests from a firewall management user interface (UI) 246, which, in one example, provides a user interface for viewing and/or modifying currently active security settings such as profiles, rules, and/or exceptions. The SHS 242 monitors system shut-down modes, and partial shut-down modes, such as hibernations and stand-by modes. SHS 242 may communicate to the firewall system 200 whether any of the hibernation, shut-down or partial shut-down modes are present. The NLA 244 monitors network connections and communicates status of network connections to the firewall system 200.

The firewall system 200 may include a firewall service 220, a network classification service (NCS) 214, and a filter 230. The firewall service 220 receives and manages security setting requests from the various programs 212, and selectively forwards requests to filter 230 for managing traffic appropriately. The firewall service 220 also may receive information and data used to manage firewall settings and determine whether and how settings are applied to network communication. Further, the firewall service 220 may monitor both inbound and outbound traffic and connections. Filter 230 may be various types of filtering engines, and may be implemented at various levels in an operating system, such as at a kernel layer, user layer, or combinations thereof.

In one example, the firewall service 220 may operate and manage network security settings including rules, exceptions, scope of exceptions, and flags organized in a data structure 250. The data structure 250 may comprise a plurality of security settings forming a security profile. The data structure 250 includes a plurality of data sets, including first set 260, second set 270, etc. The first set of settings 260 includes a first rule (rule 1) 262, a first exception (exception 1) 264, a first class (class 1) 266, and a first flag (flag 1) 268. The second set of settings 270 includes a second rule (rule 2) 272, a second exception (exception 2) 274, a second class (class 2) 276, and a second flag (flag 2) 278. Data structure 250 is one example embodiment of a data structure, and various others may be used with different organization, settings, etc. Further, while a single data structure 250 is shown corresponding to a single profile, a plurality of data structures, and thus security profiles, may be included in firewall service 220, as described with regard to FIG. 3.

Continuing with data structure 250 of FIG. 2, the data sets indicate corresponding settings, such that exception 1 264 is an exception that applies to rule 1 262. Likewise, class 1 266 is a listing of one or more classes to which exception 1 264 applies. Finally, flag 1 268 applies to exception 1 264 in classes of class 1 266.

Various types of network security rules may be used, such as prompting a user to enable each and every connection attempted. Further, learning rules may be used that learn from previous user inputs and requests. Other rules may include intrusion detection, where firewall system 200 terminates or blocks connectivity where an intrusion may be suspected or attempted. For example, the firewall system 200 may prevent various applications or services from accessing the network 210. The firewall system 200 may also prevent nuisance access, prevent other computing devices from accessing applications providing local network services, and/or alert the user about outgoing connections and applications making the connection attempt.

Firewall service 220 may also operate and manage security settings that include various exceptions to security rules. An exception may override one or more rules at the request of programs and services so that the programs and services can receive inbound traffic and/or send outbound traffic. As another example, an exception may include a file sharing and/or print sharing exception. In the example of data structure 250, exception 1 264 operates to override rule 1 262 for networks in class 1 266.

Exceptions may be configured and enabled in various ways. For example, an exception may be configured to override one or more features of a security rule, and may be application specific, user specific, program specific, port specific, etc. Thus, in addition to allowing specific incoming and/or outgoing traffic, firewall exceptions can be used to define which users, applications, and/ or computer accounts (or groups of accounts) are authorized to initiate network connections. In this way, it is possible to specify that only traffic from specific users, applications, or computing devices should be accepted by a particular device on a network. In addition, exceptions may also be configured to allow a remote terminal connection, file and print sharing, and/or remote assistance.

Exceptions may be configured by a user as noted above, such as via APIs 240. While a user may configure the exceptions, an operating system or an application may also configure an exception automatically if a security issue is encountered with a service or application. The ability to enable, allow, add, and/or modify exceptions may be limited to certain privilege levels, such as requiring administration privileges. As noted above, exceptions may also be configured to be applied to selected programs and/or ports. For example, computing devices on a common subnet can connect using a selected program; however, traffic that originates from a remote network may be blocked.

An exception may also be enabled or disabled. For example, under a first set of defined conditions, exceptions may be enabled, and under other defined conditions, exceptions may be disabled. When exceptions are disabled, the firewall service 220 may block activities included in exceptions, such as all network connection requests, file and printer sharing, and/or the discovery of network devices.

Firewall service 220 may manage security rules and exceptions based on network class. Details regarding network class are described below with regard to FIG. 6. Data structure 250 is shown having class settings (e.g., class 1 266), where the class settings may indicate networks to which corresponding exceptions (e.g., exception 1 264) applies. In one example, automatic revocation of selected exceptions may occur in response to a triggering event depending on a class of a network to which the system is connected (e.g., a class to which the exception applies, such as class 1 266) as described further in FIGS. 4-5.

Firewall service 220 may also manage security rules and exceptions based on a flag, which may be a persistence flag, such as flag 1 268. The persistence flag may be used to identify selected individual exceptions that are to be maintained even when auto-revocation would otherwise occur due to a triggering event. The persistence flag may indicate whether corresponding exceptions that are enabled in a specific class are maintained or automatically revoked upon triggering events. For example, if a triggering event indicates that exception 1 264 should be automatically revoked for class 1 266, the exception may still be maintained if flag 1 268 is set to a persistence mode. In this example, a persistence flag set to ON indicates the firewall maintains a corresponding exception in response to triggering events. Likewise, a persistence flag set to OFF indicates the firewall auto-revokes corresponding exceptions in response to triggering events. While FIG. 2 shows a persistence flag for each exception, the persistence flag may be stored on a profile basis, where all exceptions in a profile have a common persistence flag setting as described in the example of FIG. 3. In still another example, both profiles and individual exceptions may have a persistence flag. Further, a persistence flag may be class specific and/or it can also be rule/exception specific. If both profiles and individual exceptions have a persistence flag, a conflict between the settings may be resolved in favor of the persistence flag on an individual exception (over that of the profile) or vice versa based on a preset configurable desired security function. Further, an administrator/user can set a profile persistence flag on a profile to be OFF but specific rules can have a rule persistence flag ON. Thus, only rules with a persistence flag ON are persisted upon a triggering event.

Figure 3:
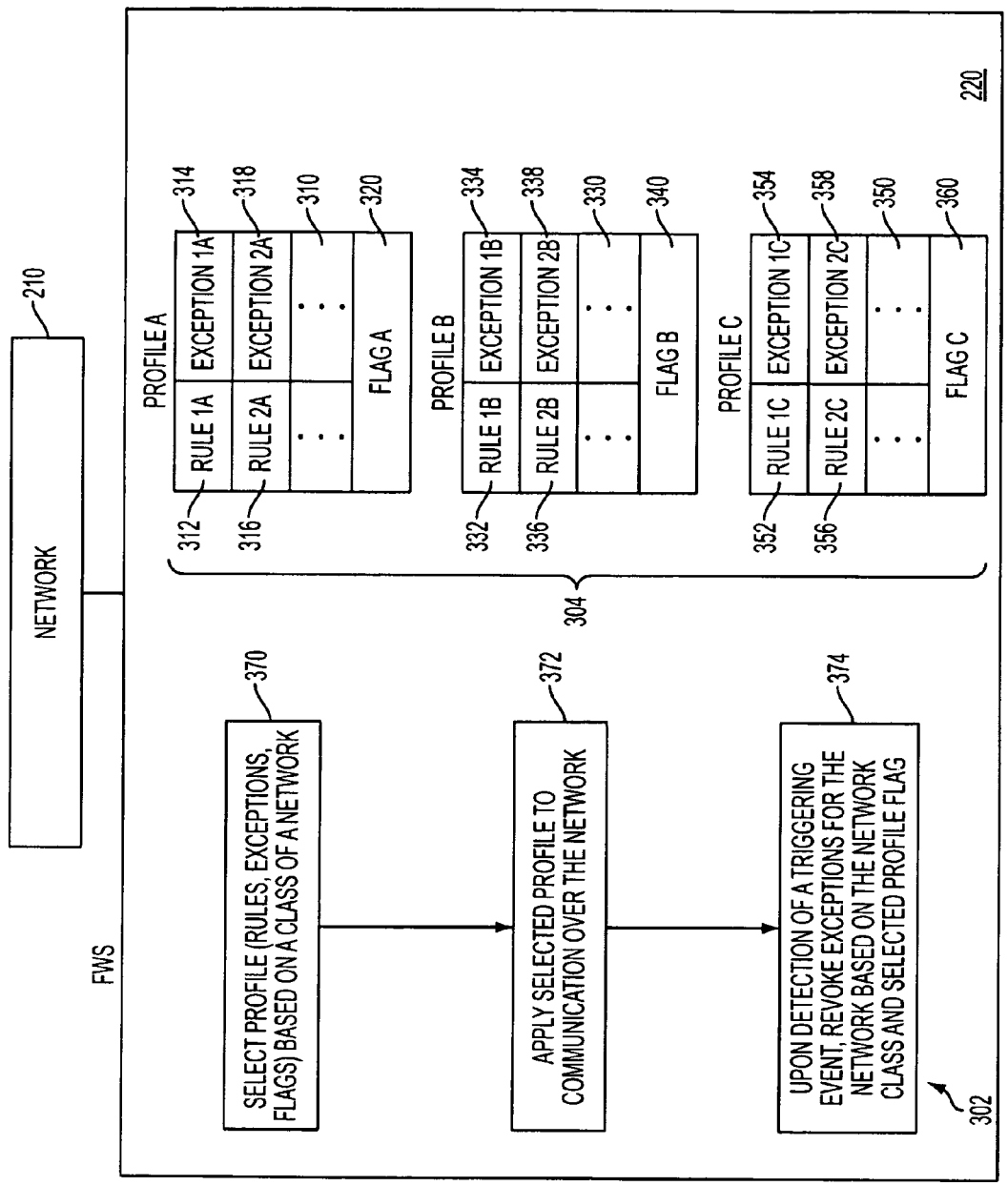
FIG. 3 is a diagram showing one example of a process flow and corresponding security profile data structures.

As described above with regard to FIG. 2, the firewall service 220 may include a plurality of firewall profiles or data structures 250, where the firewall service 220 selects and applies one of the firewall profiles to network communication based on a network class. Referring now to FIG. 3, which shows additional details of FIG. 2, firewall service 220 is shown coupled to network 210. Firewall service 220 is shown carrying out a process flow 302 that manages selection and application of three example data structures 304 corresponding to three example security setting profiles (profile A 310, profile B 330, and profile C 350). While this example shows three profiles, more or less profiles may be used.

Profile A 310 includes a first rule 1A 312 having a first corresponding exception 1A 314, a second rule 2A 316 having a second corresponding exception 2A 318, and additional rules and exceptions not shown. Further, profile A 310 includes a persistence flag A 320 that corresponds to all exceptions in profile A 310 (e.g., the persistence flag is stored on a profile basis).

Each of the two example additional profiles (profile B 330 and profile C 350) having a similar structure, although in an alternative embodiment they may have a different structure with different number of rules, exceptions, and flags. In the example of FIG. 3, Profile B 330 includes a first rule 1B 332 having a first corresponding exception 1B 334, a second rule 2B 336 having a second corresponding exception 2B 338, and additional rules and exceptions not shown. Further, profile B 330 includes a persistence flag B 340 that corresponds to all exceptions in profile B 330. Likewise, Profile C 350 includes a first rule 1C 352 having a first corresponding exception 1C 354, a second rule 2C 356 having a second corresponding exception 2C 358, and additional rules and exceptions not shown. Further, profile C 350 includes a persistence flag C 360 that corresponds to all exceptions in profile C 350.

In one example implementation, firewall service 220 manages the example profiles based on network class. For example, each firewall profile may apply to one or more networks based on network class. Such mapping between firewall profile and network class may be extended to any number of network classes and profiles, and may include a 1:1 mapping between network class and profile.

Referring now to the process flow 302 of FIG. 3, in 370 the firewall service 220 selects a security profile (including rules, exceptions, and flags in this example). As described above, the selection of the profile may be based on a class of a network to which the profile settings will be applied. In 372, the firewall service 220 applies the selected profile to communication over the network. In 374, the firewall service 220, upon detection of a triggering event, revokes exceptions selectively for the network based on network class and selected profile persistence flag.

As one example, firewall service may manage communication over two networks, network 210 and 208. Network 210 may be of a first class, and network 208 may be of a second class. Firewall service 220 may select profile A 310 for network 210, and profile B 330 for network 208 based on the respective first and second classes. Further, the firewall service 220 may apply profile A 310 to communication over network 210 and profile B 330 to communication over network 208. Then, upon the triggering event, networks in the first class (e.g., network 210) may operate with the exceptions in profile A 310 being auto-revoked (unless persistence flag A 320 is ON), where networks in the second class (e.g., network 208) may operate with exceptions in profile B 330 maintained across the triggering event. By applying the revocation of exceptions selectively based on network class, networks with increased security risk may have increased security settings, whereas networks with decreased security risk may have decreased security settings. Further, the settings can be managed by the firewall service 220 upon triggering events to increase both usability and security.

In one example, the three profiles 310, 330, and 350 may be labeled Work, Private, and Public and correspond to three network classes also labeled Work, Private (or Home), and Public. This is an example of 1:1 mapping between profile and network class (there can be 1:n and n:1 mappings between profile and network class where n is more than or equal to 1). In this example, firewall service 220 may maintain Work and Private profile exceptions across all networks in the Work and Private classes, while auto-revoking settings for Public profiles across all Public networks. Specifically, Work and Private networks may be configured with a stronger security infrastructure and a well-known, mostly singly administered (at least at the highest level) set of machines, as compared to more open Public networks with a weaker security infrastructure and a greater number of unknown machines administered by different administrative entities. Thus, exceptions in the profile(s) assigned to Public networks may be automatically revoked upon triggering events while exceptions in the profile(s) assigned to Private and Work networks may be maintained even upon triggering events.

Figure 4:
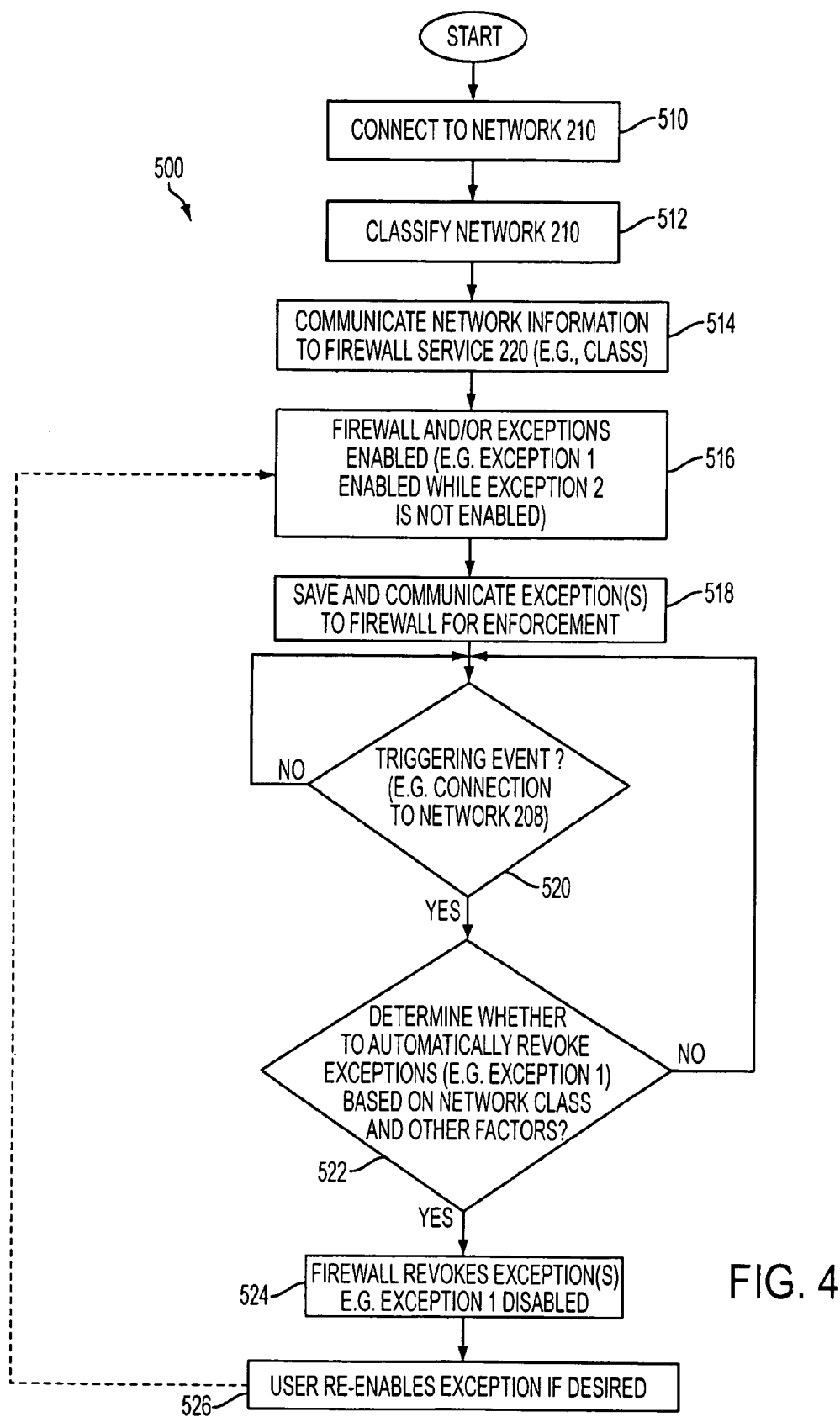
FIG. 4 is a flow diagram representing one example of a process flow for applying firewall exceptions.

FIG. 4 shows a more detailed example process flow 500 for managing revocation of exceptions as compared with process flow 302 of FIG. 3. Process flow 500 applies and revokes security settings based on triggering events using the system of FIG. 2. In 510, a connection to network 210 is made. Network 210 may be a new, unknown, and unclassified network to the firewall system 220, or may be a previously connected and classified network. Then, in 512, the NCS 214 classifies the network based on various factors, as described in more detail below with regard to FIG. 6. For example, the network may be classified as a Public, Private, or Work network.

Then, in 514 the NCS 214 communicates with the firewall service 220 presence of the network and the network class. Further, additional information and/or status of the network may be provided, such as information provided by programs 212. Further still, information about users in the network and/or infrastructure of the network may be communicated. Next, in 516, an application or user enables the firewall and/or one or more security settings in a profile corresponding to the class of network 210. In one example, the user may enable an exception 1 (264) and leave exception 2 274 disabled through the firewall user interface 246, where classes 266 and 276 correspond to the class of network 210. Thus, the firewall service 220 may apply the user-enabled exception to a plurality of networks, or all networks, of a specified class. Exception 1 264 is then saved and communicated in 518 to the filter 230, which internally enforces/enables exception 1 (while ignoring non-enabled exceptions, such as exception 2) for network communication over network 210 (as well as any other network having the same class as network 210).

Continuing with FIG. 4, in 520, a determination is made as to whether a triggering event has occurred. If the answer to 520 is YES, the process flow continues to 522. If the answer to 520 is NO, the process flow returns and continues monitoring for triggering events. As described in further detail with regard to FIG. 5, various triggering events may be used, such as a connection to a new network (e.g., network 208, which may be a previously unknown and/or unclassified network), a software download from network 210, and/or others. In the example of a new network connection, the NLA service 244 may identify and communicate the occurrence of the event.

In 522, the firewall service 220 determines whether to automatically revoke exceptions based on various parameters, including network class, the type of triggering event, a persistence flag of the network profile, and/or additional parameters. In one example, the additional parameters used in 522 may include a software state. The software state may be a state of firewall software in firewall service 220, a state of software communicating with firewall service 220, or others. The software sate may include whether software patches are up-to-date, whether anti-virus software is up-to-date, etc. The additional parameters in 522 may also include user traits. The user traits may include a group of the user, network downloading characteristics of the user, privilege level of the user, etc. While in this example the firewall service 220 identifies the triggering event, other services may also perform this action.

When one or more exceptions are to be auto-revoked (i.e., the answer to 522 is YES), the process flow continues to 524 where the firewall service 220 automatically revokes one or more exceptions in the profile corresponding to network 210 based on the persistence flag of that profile, or individual persistence flags of each exception. For example, exception 1 264 may be automatically revoked in response to the triggering event identified in 520 when flag 1 268 is set to NO. The auto-revocation may occur for all exceptions in a profile, or the revocation may occur on an individual exception basis.

Then, in 526, the user may re-enable exceptions if desired, such as through a user prompt, in which case the process flow resumes at 516. For example, security settings, such as exceptions that were revoked upon selected events, may be re-enabled by a user, a service, an application, etc.

When the answer to 522 is NO, the routine maintains the exception(s) and continues to monitor for triggering events.

As shown by the process flow of FIG. 4, it is possible to selectively apply auto-revocation of firewall settings, such as exceptions, to a plurality of networks in different classes to increase both usability and security. While the above description illustrates one example following the process flow of FIG. 4, various other operations may also occur. For example, as noted, auto-revocation based upon triggering events may be applied to a plurality of exceptions in a firewall profile of a specified network class. Thus, in contrast to auto-revocation for a single exception, the system may be configured (e.g., by default) to have a plurality of profile exceptions (and possibly all exceptions) automatically revoked upon a triggering event for a specified network class.

As described above herein, depending on the network class, maintenance of exceptions across some or all networks of a specified class can increase security risks under various situations. For example, new network connections, software downloads, user actions, and various other events may increase the security risk of network communication. As such, the firewall service 220 may carry out selected auto-revocation of one or more (or all) exceptions depending on various factors, including network class, as described herein. For example, the auto-revocation may occur for some or all exceptions in a profile, or the revocation may occur on an individual exception basis. In one example, if an exception is revoked due to a selected triggering event, then that exception may be disabled for some or all networks of the specified class. In this way, user intervention may be reduced while still providing increased security in the most likely scenarios where such security is advantageous.

While auto-revocation of security settings may be advantageous for selected classes of networks (because security risks are high on such networks), it may not be desirable to use auto-revocation for other network classes that are with lower security risks and where the usability impact of auto-revocation may be greater than the risk of maintaining exceptions. In other words, maintaining security settings, such as profiles and/or exceptions, across networks of the same class or across network classes may improve usability at the expense of security. When settings are maintained, once a requester enables an exception, then that exception may be automatically applied to some or all networks in the specified class without requiring additional requester input. Likewise, requester intervention may be used to disable the exception, thus creating a potential for decreased security.

Alternatively, auto-revocation of security settings can improve security (by reducing user or other requester input) at the expense of usability. In this case, a requester of a specific setting repeatedly enables the setting upon each triggering event. For example, if a selected exception is desired for a Public network, then a requester re-enables that selected exception after each triggering event (auto-revocation) on any Public network (if the requester desires that selected exception to apply).

Figure 5:
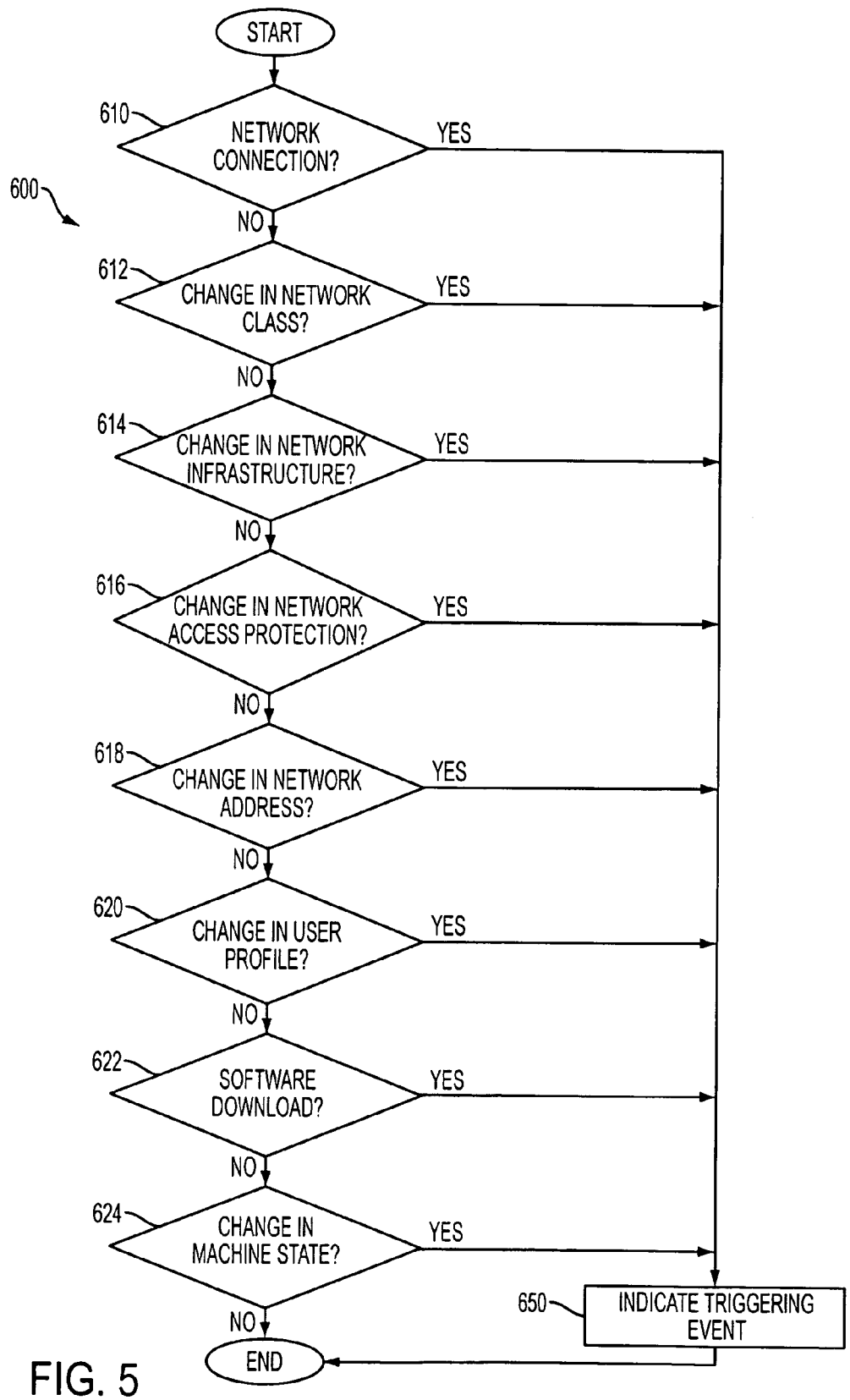
FIG. 5 is a flow diagram representing one example of a process flow for identifying triggering events.

Referring now to FIG. 5, an example process flow 600 for identifying triggering events is described. While this example provides numerous triggering events considered in a serial order, the events may be monitored via various multi-tasking environments or in a variety of orders.

In 610, a determination is made as to whether a connection to a new network has occurred. The network may be a known and previously classified network or may be an unknown and/or unclassified network.

If the answer to 610 is NO, in 612, a determination is made as to whether a change in network class of at least one currently connected network has occurred. The change in class may occur through automatic network classification (e.g., via NLA 244) or through user classification of a network.

If the answer to 612 is NO, in 614, a determination is made as to whether a change in network infrastructure has occurred. For example, the process flow may consider whether network infrastructure of a network has changed from a perimeter protected (via an edge firewall) to an unprotected (no edge firewall).

If the answer to 614 is NO, in 616, a determination is made as to whether a change in network access protection has occurred, such as going from a secured wireless access point to an unsecured wireless access point of a network. The network access protection may include a number or security level of network verification checks on connected networks.

If the answer to 616 is NO, in 618, a determination is made as to whether a change in network address (e.g., IP address) of a network has occurred.

If the answer to 618 is NO, in 620, a determination is made as to whether a change in a user profile has occurred. The user profile may include various parameters associated with a particular user, such as an assessment of the user, privileges of the user, a reputation of the user, security risk of the user, or others.

If the answer to 620 is NO, in 622, a determination is made as to whether software having specified features has been downloaded over a connected network. For example, a download of a file having selected characteristics in terms of file name, data structure, or size may result in indication of a triggering event.

If the answer to 622 is NO, in 624, a determination is made as to whether change in a machine state has occurred. The machine state may include a status of software, such as in programs 212 or other programs communicating with firewall service 220. The software state may include a patch state, anti-virus update date, hardware configuration, or others.

If the answer to any of 610, 612, 614, 616, 618, 620, 622, or 624 is YES, the routine continues to 650 to indicate a triggering event.

Figure 6:
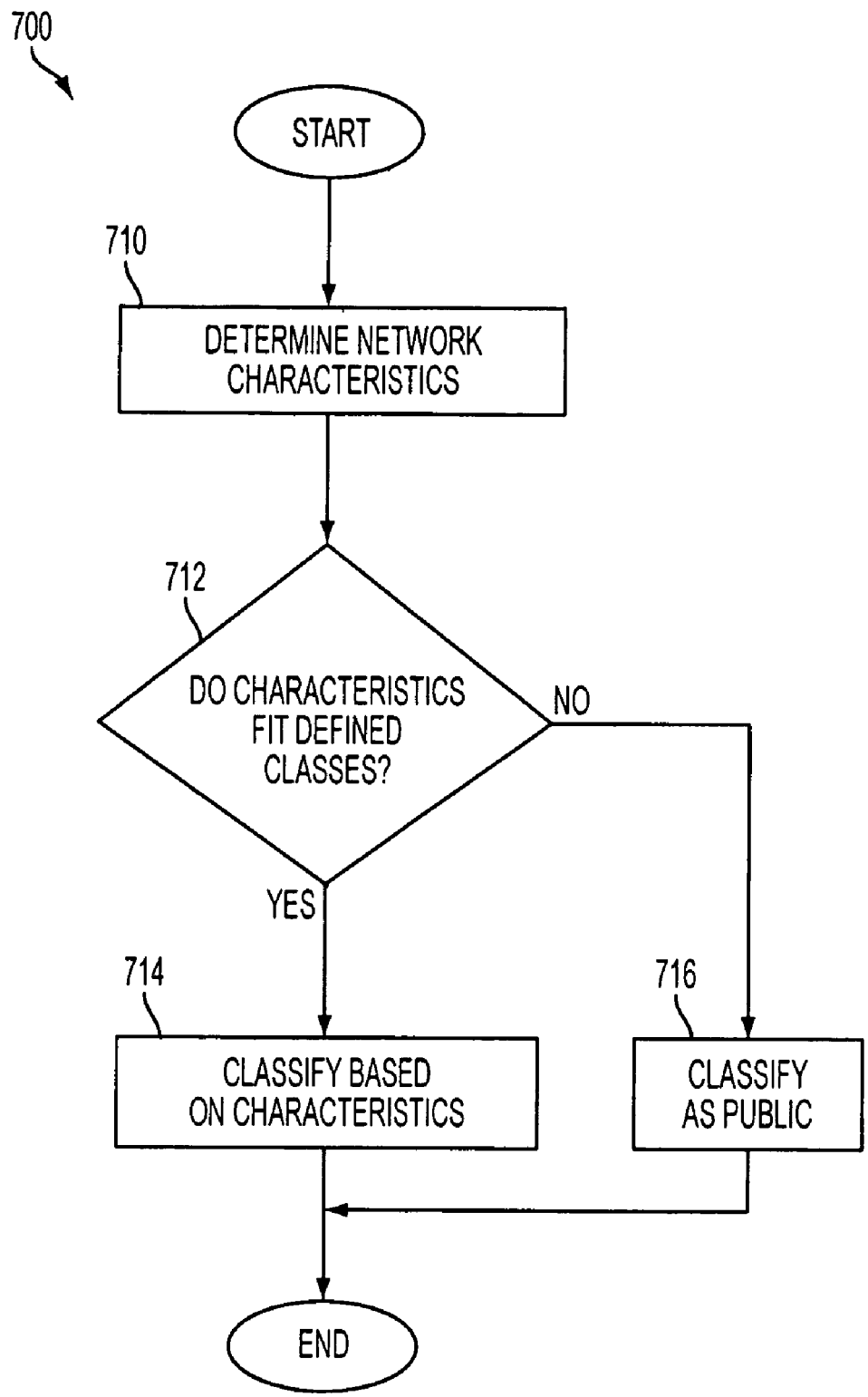
FIG. 6 is a flow diagram representing one example of a process flow for classifying a network.

Referring now to FIG. 6, an example firewall program for classifying a network is described. Networks may be classified into one of a plurality of classes by NCS 214 based on several selected characteristics. While various characteristics may be used, the following list includes example characteristics that may be used to identify an appropriate class, at least with regard to auto-revocation of firewall exceptions.

The various characteristics may include network classifying characteristics, such as network scope, network technology, network management, network security, network connectivity, network addressing, network service infrastructures, network mobility, network intended use, network topological placement, network operational parameters, network premise/proximity, and others.

Network scope characteristics may include coverage scope of a network. The coverage scope of a network may include the extent of connectedness of a network, which may be defined as personal, local, metropolitan, or wide area networks.

Network technology characteristics may include a type of network technology in use, such as wireless, or wired, etc.

Network management characteristics may include whether or not both a network infrastructure and network nodes in a network are managed by administrators.

Network security characteristics may include whether a network is protected from intrusions, operating system attacks, impersonation, and/or viruses.

Network connectivity characteristics may include a form of connectivity upon leaving one network and entering another network, such as going from direct connection to a virtual private network connection or going from a protected wireless connection to an unprotected wireless connection.

Network addressing characteristics may include a kind of IP address used on a network, such as internal (private) non-routable addresses or external (public) routable addresses or both. It may also include Media Access Control and (MAC) addresses and IP addresses of routers/gateways and of other infrastructure services such as Dynamic Host Configuration Protocol (DHCP) servers servicing a subnet of a client machine.

Network service infrastructure characteristics may include a kind of service infrastructure present on a network, such as "no fixed services" as in an ad-hoc, mesh, or peer-to-peer network or "fixed services" as found on infrastructure networks where services such as a domain name service, firewall service 220, etc. are deployed.

Network mobility characteristics may include whether a network is mobile or static. Whether a network is mobile may be based on, for example, whether an address of a routing device in a network changes while that of nodes inside the network served by the routing device do not. In contrast, whether a network is static may be based on whether the routing device's external address (and by implication that of the network the routing devices serves) does not change.

Network intended use characteristics may include whether a network is private or public.

Network topological placement characteristics may include a topological placement of a network with respect to other networks, which in turn has a bearing on flow of information.

Network operational parameters characteristics may include network speed, throughput, load, quality of service, latency, jitter, packet loss, cost, etc.

Network premise/proximity characteristics may include whether a network is a premise or a proximity network. A premise network may include a private network at a particular location having many LANs spread among different physical locations belonging to an organization. A proximity network may include a single or multi-hop ad-hoc network established by a set of nodes on a shared wireless channel by virtue of proximity to each other.

Returning to FIG. 6, the above characteristics may be used to classify a network. Specifically, in 710, the process flow 700 determines characteristics of a network, such as network 210. The characteristics may be based on real-time data and/or based on data stored regarding previous connections to the same network including previously provided user categorization of the network.

Next, in 712, the process flow 700 determines whether the identified characteristics fit a defined network class. The process flow 700 may use predetermined network classes defined by a user or administrator, or hardwired in the firewall service 220. Alternatively, the class characteristics may be adapted over operation. In one example, the process flow 700 may determine whether the characteristics fit one of a set of predefined classes, such as the example classes discussed above (Work, Private, Public). If the answer to 712 is YES, in 714, the network is classified to the appropriate matching class. Otherwise, when the answer to 712 is NO, the process flow 700 continues to 716 to classify the network to a default class. A predefined class may be used as the default class for all networks not matching the available predefined classes. On connecting to a new network, if the class of the network can not be determined as one of a predefined class, the user may be prompted for the class of the network. As an example embodiment, there may be three predefined classes such as Work, Private, and Public and another default class for networks not in any of the predefined classes. In this embodiment, when a machine connects to a new and unclassified network, then if a client machine operating the firewall service is able to discover and authenticate to a domain controller (for the domain that the machine belongs to), the network may be categorized as a Work network. If the machine is unable to discover and authenticate to such the domain controller, the user can be prompted to classify the new network. For example, the user may be asked to classify the new network as one of a predefined set of classes, or a default (residual) class. In another embodiment, three predefined network classes may be used, such as: Work, Private, and Public. In this case, if the new network is determined to be not in the Work class by the firewall service, the user can be prompted to indicate whether the network is Private. If the user does not indicate the network as Private, the network can be automatically classified as the least secure network, e.g., a Public network.

In addition to the above mentioned triggering events discussed with respect to FIG. 5 for determining whether auto-revocation of class-based firewall exceptions should be performed, various events may occur through which auto-revocation is avoided. For example, it may be advantageous for usability reasons to maintain exceptions across power events (shutdown, hibernate, standby) as long as the same network(s) is(are) connected. This operation may be performed by storing an identification of a connected network in a registry or some other repository, and then when connecting to a network after a power event, comparing the stored identification to a current identification of the connected network to determine whether a triggering event should be indicated. If the stored and current identifications match, enabled exceptions may be maintained (no triggering event indicated). If the stored and current identifications do not match, auto-revocation may be performed (triggering event indicated).

Figure 7:
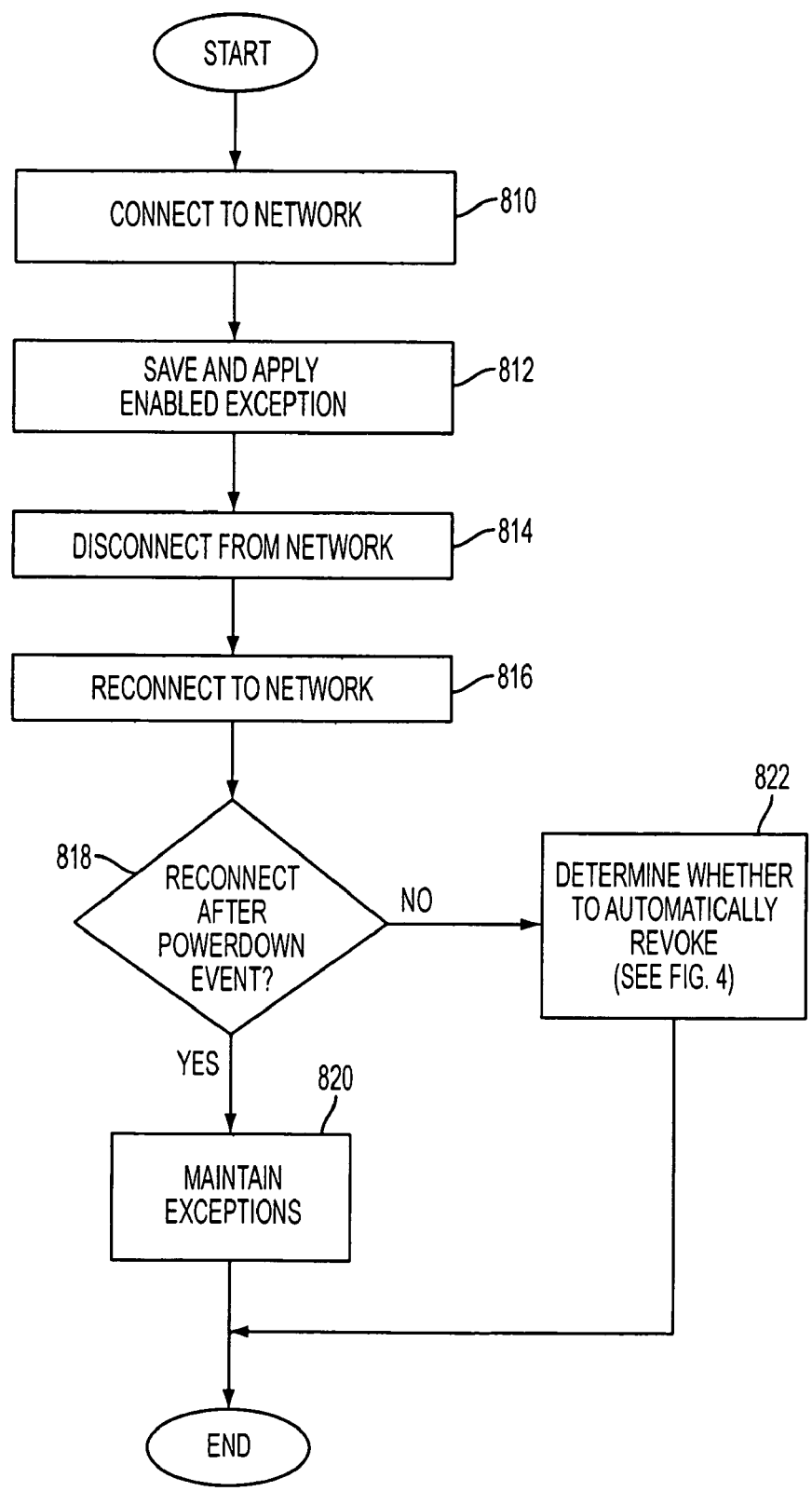
FIG. 7 is a flow diagram representing one example of a process flow for managing exceptions across power events.

FIG. 7 illustrates a process flow for indicating a triggering event related to power events and other network connection events, along with reference back to the system of FIG. 2. Specifically, in 810, the process flow shows a connection to a network, such as network 210. The connection may be indicated by NLA 244 to the firewall service 220. Then, the firewall service 220 in 812 applies enabled exceptions to the connected network, and saves enabled exceptions. At 814, the network is disconnected. The network may be disconnected due to a loss of network signals, user-initiated disconnect, or a client shutdown, hibernation, and/or standby mode via SHS 242. Then, in 816, a network connection is again established, and if such a connection is a re-connection to previously connected network after a selected power down/up event as determined in 818, the process flow continues to 820 to maintain exceptions (no triggering event indicated). Thus, if a reconnection to network 210 after a hibernation/standby/shutdown occurs, exceptions are maintained in 820. Otherwise, when the answer to 818 is NO, in 822, the firewall service 220 determines whether auto-revocation of exceptions is utilized as previously described herein, such as with regard to FIG. 4 (triggering event indicated). In this way, increased usability can be obtained during selected power down/up events in coordination with the described auto-revocation of exceptions based on network class.

The specific process flows, programs or methods described herein may represent one or more of any number of processing strategies such as event-driven, interrupt-driven, multi-tasking, multi-threading, and the like. As such, various actions illustrated may be performed in the sequence illustrated, in parallel, or in some cases omitted. Likewise, the order of processing is not necessarily required to achieve the features and/or results of the example embodiments described herein, but is provided for ease of illustration and description. One or more of the illustrated actions may be repeatedly performed depending on the particular strategy being used. Further, the described actions may represent code to be programmed into a computer readable storage medium.

It will be appreciated that the configurations and/or approaches described herein are merely examples, and that these specific embodiments or examples are not to be considered in a limiting sense, because numerous variations are possible. For example, auto-revocation upon selected triggering conditions may be applied to other software policies, such as to software restriction policy (SRP). The SRP provides a mechanism where only trusted code is given unrestricted access to a user's privileges. Unknown code, which might contain viruses or code that conflicts with currently installed programs, is allowed to run only in a constrained environment where it is disallowed from accessing any security-sensitive user privileges. For example, if a particular software restriction policy is applied when a machine connects to a network, that policy can be revoked when the machine connects to a different network. As with the examples described above, such features may be further utilize a persistence flag for one or more attributes of the SRP to determine whether the policy is maintained across various networks.

The subject matter of the present disclosure includes all novel and non-obvious combinations and sub-combinations of the various processes, systems and configurations, and other features, functions, actions, and/or properties disclosed herein, as well as any and all equivalents thereof.

The invention claimed is:

1. A method of managing security settings of a firewall and exceptions to security settings of the firewall in a networked environment, the method comprising:
    managing security settings and exceptions based on network class to control network communication through the firewall;
    receiving a connection request from a computing device to a first network;
    classifying the first network to a specified network class, the classifying at least partially based on a user input from a user of the computing device;
    applying at least one exception to the first network based on the first network being in the specified network class; and
    upon detection of a change in network connection from the first network to a second network, classifying the second network to the specified network class, the classifying at least partially based on user input from the user of the computing device and revoking the at least one exception for the second network, wherein the at least one exception includes a network security exception enabled by the user to a network rule managed by the firewall, and the revoking occurs automatically according to the network security exception enabled by the user.

2. The method of claim 1 wherein the revoked exception is an application-enabled exception to a firewall rule.

3. The method of claim 1 wherein a plurality of exceptions are revoked upon detection of the change in the network connection.

4. The method of claim 1 wherein said revocation is based on a persistence flag associated with the at least one exception, the persistence flag identifying no persistence of the at least one exception.

5. The method of claim 1 further comprising, upon detection of a change in network class, or a change in network infrastructure for the first network, revoking the at least one exception for the first network.

6. The method of claim 1 wherein said change in network connection includes a change in a network address.

7. The method of claim 1 further comprising, upon detection of a change in a risk assessment of a user, revoking the at least one exception for the first network.

8. The method of claim 1 further comprising, upon detection of a software download over the first network, revoking the at least one exception for the first network.

9. The method of claim 1 further comprising, upon detection of a change in a software status of software communicating with the firewall, revoking at least one exception for at least one network.

10. A method of managing security settings of a firewall in a networked environment, the method comprising:
    managing a security profile with at least a first security setting for network communication through the firewall, the first security setting applied to network communication over networks in a specified class;
    receiving a user-selected request for a second security setting including at least one exception to the first security setting in the security profile;
    receiving a connection request from a computing device to a first network;
    classifying the first network to the specified class, the classifying at least partially based on a user input from a user of the computing device;
    applying said second security setting including the at least one exception to network communication over the first network in said specified class; and
    upon detection of an event including a connection to a second network, wherein said connection to a second network includes an establishment of a new network connection in the networked environment, classifying the second network to determine that the second network is in the specified class, the classifying at least partially based on a user input from the user of the computing device, and automatically revoking at least said at least one exception from being applied to network communication over the second network based at least on the second network being in said specified class and applying said first security setting to network communication over the second network in said specified class.

11. The method of claim 10 further comprising monitoring a flag identifying persistence of the at least one exception, said automatic revocation further comprising automatically revoking the at least one exception when the flag identifies no persistence of the at least one exception, and further comprising maintaining the at least one exception for a network of the specified class when the flag identifies persistence of the at least one exception.

12. The method of claim 10 further comprising, upon detection of a change in a network classification to the first network, revoking the at least one exception from being applied to network communication over the first network.

13. The method of claim 10 wherein said event further includes a change in a network infrastructure, a change in a network access protection, a change in a risk assessment of a user, or a software download over the networked environment.

14. A computerized system for network communication in a networked environment having networks of a first class and networks of a second class, comprising:
    a computing device configured to connect to a first unknown network and a second unknown network;

a network classification program configured to classify networks into the first and second classes, the classification at least partially based on user input from a user of the computing device and also based on network characteristics including a security level, the first class including networks of a lower security level than the second class;

a firewall program having a plurality of selectable exceptions for each of the first and second classes, the firewall program configured to automatically revoke at least one exception previously enabled for networks of the first class upon a connection by the computing device to a first unknown network of the first class; and the firewall program further configured to automatically maintain at least one exception previously enabled for networks of the second class upon a connection by the computing device to a second unknown network of the second class.

15. The system of claim 14 wherein the firewall program is configured to revoke all exceptions previously enabled for networks of the first class upon the connection to the first unknown network.

16. The system of claim 14 wherein the firewall program is further configured to determine whether to revoke at least one exception based on whether a system shut-down preceded the connection to the first or second unknown networks.

* * * * *